United States Patent [19]

White et al.

[11] Patent Number: 4,502,674
[45] Date of Patent: Mar. 5, 1985

[54] AUTOMOBILE COMPARTMENT COVER WITH DROP PANEL

[75] Inventors: James E. White; Mark Lobanoff, both of Troy; Robert A. Harris, Novi, all of Mich.

[73] Assignee: Irvin Industries, Inc., Troy, Mich.

[21] Appl. No.: 476,598

[22] Filed: Mar. 18, 1983

[51] Int. Cl.³ ............................................... B60R 5/04
[52] U.S. Cl. ............................. 296/37.16; 296/76; 160/23 R; 160/121 R
[58] Field of Search ............... 296/76, 37.8, 37.16, 296/24 R, 98, 99 R; 160/DIG. 2, DIG. 3, DIG. 4, 121 R, 121 C, 23 R, 66-67; 242/107.1, 107.13, 107.15, 100.1

[56] References Cited

U.S. PATENT DOCUMENTS

| | | | |
|---|---|---|---|
| 1,069,218 | 8/1913 | Batten | 160/121 X |
| 1,786,048 | 12/1930 | Williams | 296/98 |
| 2,583,824 | 1/1952 | Dwinell et al. | 160/121 X |
| 4,139,231 | 2/1979 | Lang et al. | 296/76 X |
| 4,344,474 | 8/1982 | Berman | 160/121 R |

FOREIGN PATENT DOCUMENTS 2733165  2/1979  Fed. Rep. of Germany ... 296/37.16

Primary Examiner—Robert B. Reeves
Assistant Examiner—Russell D. Stormer

[57] ABSTRACT

A cover for an automobile compartment, such as the window-exposed rear compartment of a hatchback or station wagon, adapted to extend horizontally over the top of the compartment from a roller mounted behind the rear seat and including a drop panel adapted to conceal any view of the compartment back of the seat through a side window or otherwise.

5 Claims, 5 Drawing Figures

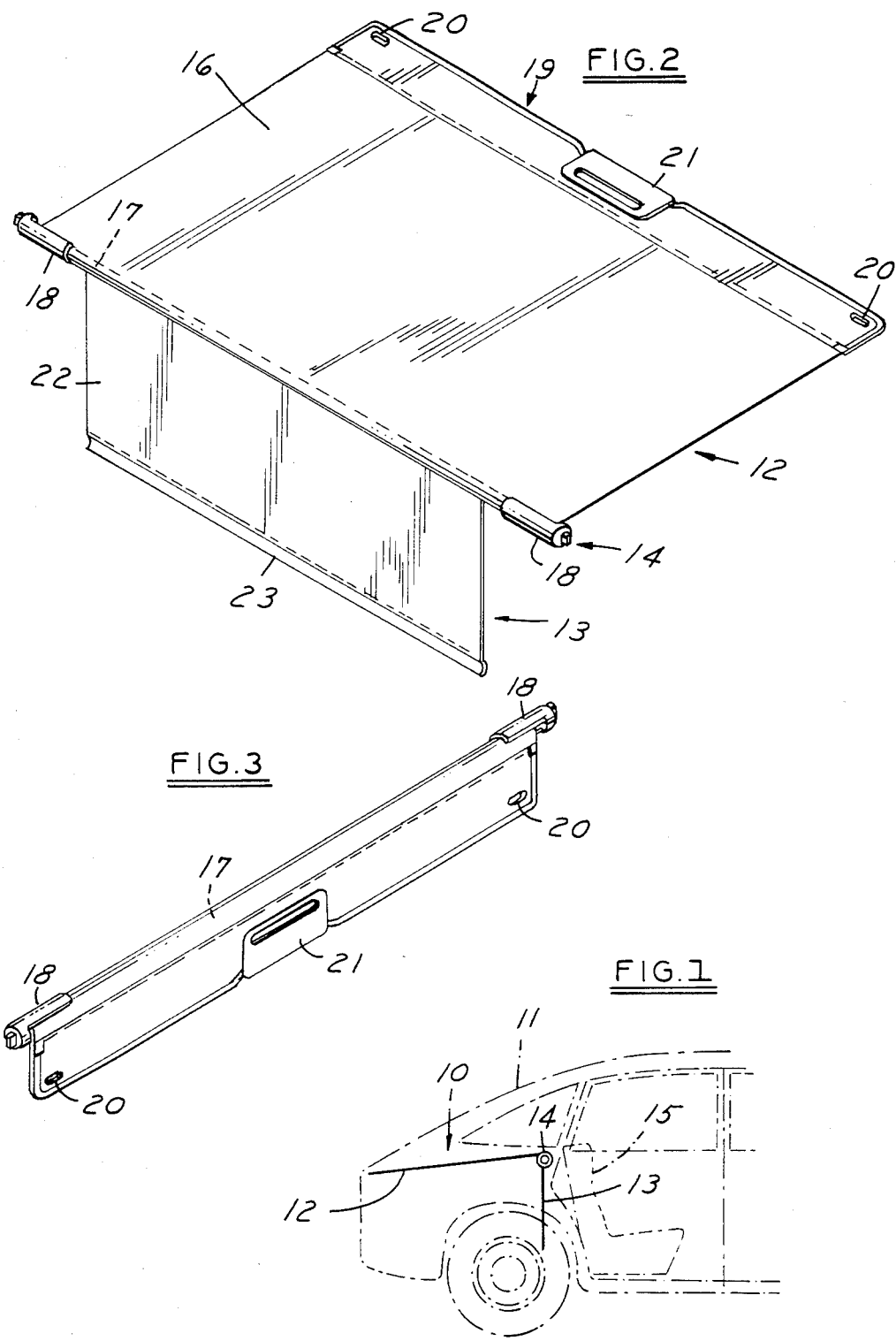

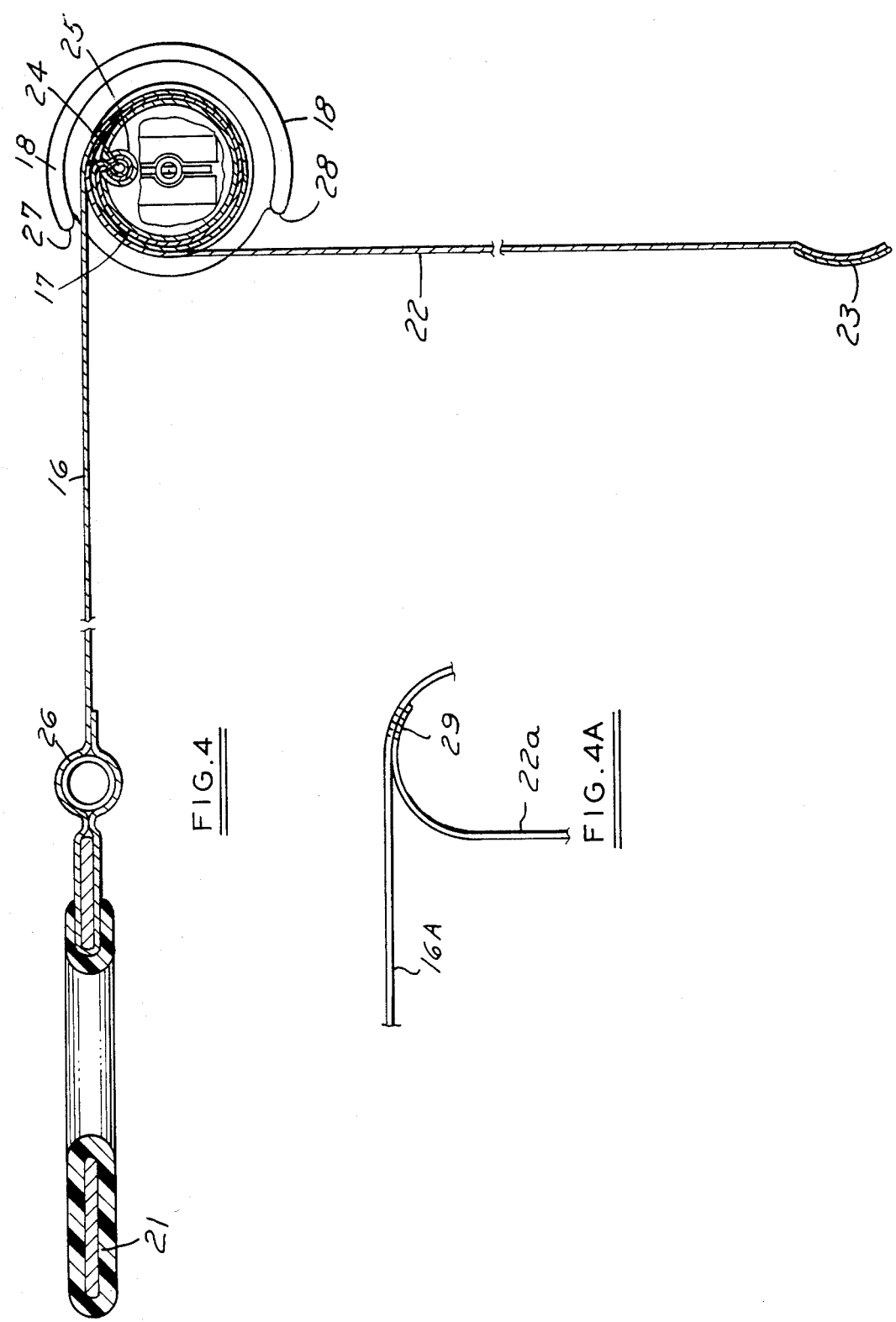

AUTOMOBILE COMPARTMENT COVER WITH DROP PANEL

BACKGROUND OF THE INVENTION

Various forms of automobile rear compartment covers are known in the art, such as disclosed in U.S. Pat. Nos. 4,139,231, 4,220,367 and 4,222,601, which serve as a security curtain to conceal luggage or other objects carried in the rear compartment of a hatchback, station wagon or similar automobile where the rear window would otherwise provide an open view of the compartment. Such shades are normally mounted on a roller located at or near the top of the rear seat in an elevated position relative to the floor of the compartment.

While such covers effectively conceal the compartment from view through the rear window, it is frequently possible to observe from the side windows the presence of luggage or other objects which the cover is intended to conceal, particularly when the rear seat back can be moved to a horizontal position when not in use by a passenger.

SUMMARY OF THE INVENTION

Supplementing a conventional rear compartment cover adapted for spring retractable manual end pull-out mounting near the rear seat back of the vehicle at an elevated position relative to the compartment floor, a flexible drop panel is attached to the underside of the flexible main cover, at or near its inner end, of a length suitable to extend vertically from the mounting to the compartment floor when the main cover is pulled out to its horizontal cover position thereby concealing the front end of the compartment from side window view.

The supplemental drop panel is made of appropriate width which may be narrower than the main cover to accommodate wheel wells, for the front end of the compartment, and is provided at its outer end with an arcuate metal insert or attachment appropriate for weighting the drop panel to assure its separation from the main cover and dependable lowering to compartment floor level as the main cover is pulled out to its cover position. The arcuate curvature is such as to match the curvature of the combined flexible cover and drop panel material at the wrapped position where the end of the drop panel reaches the roll so as to facilitate completion of retraction of the main cover to its fully retracted position.

The drop panel may be attached by suitable stitching to the underside of the main cover at an appropriate drop position for concealment in operation in order to minimize material and avoid gathering on the floor of the compartment when the main cover is overextended by raising the hatchback lid.

BRIEF DESCRIPTION OF THE DRAWINGS

FIG. 1 is a schematic view of the rear end of a hatchback style vehicle indicating generally the installed operative position of the main cover and drop panel;

FIG. 2 is a perspective view of the cover assembly per se in extended position;

FIG. 3 is a perspective view of the cover assembly in retracted condition;

FIG. 4 is an enlarged sectional side elevation of the cover assembly illustrated in FIGS. 2 and 3;

FIG. 4a is a fragmentary view showing an alternative attachment of the drop panel.

With reference to FIG. 1 cover assembly 10 is schematically illustrated in installed position to cover the rear luggage compartment of a hatchback style car 11 including main cover 12 and drop panel 13 extending from windup rear roller 14 mounted within either side of the body back of the rear seat 15. With reference to FIGS. 2 and 3 main cover 12 comprises flexible panel 16 of a length suitable to extend from windup tube 17 installed within mounting end caps 18 to the rear end of the vehicle compartment. The outer end of panel 16 is provided with a rigid end attachment 19 having fastener apertures 20 and pull-out handle 21.

Drop panel 13 comprises flexible panel 22 which may be of suitable width somewhat narrower than main panel 16 in order to extend to the compartment floor within the vehicle wheel wells and is provided at its end extremity with rigid arcuate metal strip 23 serving to weight panel 22 as well as to hold the sides at full width and assure uniform windup upon retraction.

With reference to FIG. 4 illustrating the cover assembly in extended position, windup tube 17 is mounted within end caps 18 with a preloaded windup spring, not shown, adapted to retract respective panels 16 and 22 through clockwise rotation. Respective inner ends of panel 16 and 22 are suitably secured by cross wire 24 held within channel 25 formed in tube 17 so that upon clockwise rotation of tube 17, panel 16 and 22 will be wound up together until strip 23 reaches tube 17 whereupon it will roll inside retracting panel 16 until cross tube 26 reaches the slotted opening of end caps 18 terminating the windup.

When panel 16 is drawn out to a position where end strip 23 is exposed, curvature of the end strip will cause peeling departure from panel 16 and gravity will control dropping into extracted compartment end covering position.

With reference to FIG. 4a an optional and preferred construction for drop panel 22a includes attachment to the underside of main panel 16a by suitable stitching or otherwise at a location just beyond the top of the roll when the main panel is extended to its operative cover position. This means of attachment is particularly desirable in cases where the main cover is secured to a hatchback lid causing substantial extension from the roll beyond the closed cover position when the hatchback lid is raised for access to the luggage compartment since the extra extension does not cause surplus drop feed which might otherwise gather on the compartment floor and interfere with smooth roll up retraction.

We claim:

1. An automobile rear compartment cover assembly comprising roller means including installation mounting means providing roller windup bias, rollable main cover and drop panel means connected at their respective inner ends to said roller means for conjoint rollup and extraction, said drop panel means being relatively shorter so as to become enveloped completely within said main cover upon full retraction, said main cover including outer end means to limit retraction and to facilitate manual extraction, said drop panel means including rigid outer end means adapted to allow rolled up retraction within said main cover and to facilitate parting from said main cover during its manual horizontal extraction.

2. A cover assembly as set forth in claim 1 wherein said drop panel outer end means is curved to give peeling action to free drop panel end from main panel as it is extended and weighted to induce peeling and gravity parting from said main cover upon its manual extraction.

3. A cover assembly as set forth in claim 2 wherein said drop panel outer end means includes a relatively rigid strip adapted to maintain the extended width of said drop panel.

4. A cover assembly as set forth in claim 3 wherein said strip is curved in an arc conforming substantially to the curvature of the composite rolled main cover and drop panel at the area of rolled engagement.

5. A cover assembly as set forth in claim 4 wherein said strip comprises sheet steel suitably secured to said outer end.

* * * * *